Oct. 17, 1933.           A. E. KINSLEY ET AL            1,930,717
                              ANIMAL TRAP
                          Filed July 30, 1931
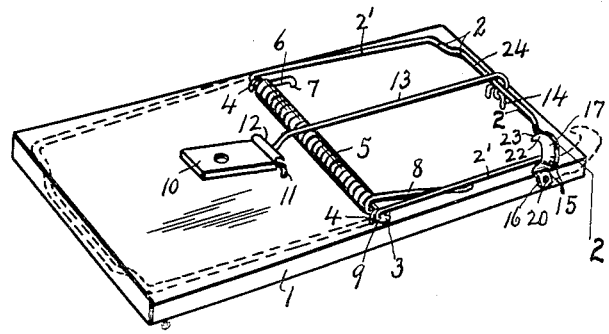
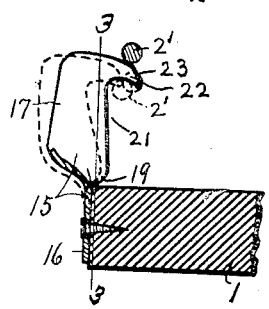
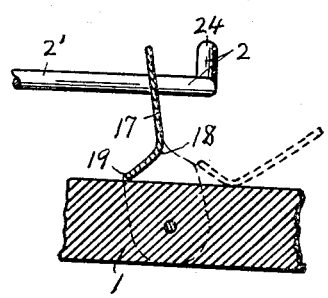
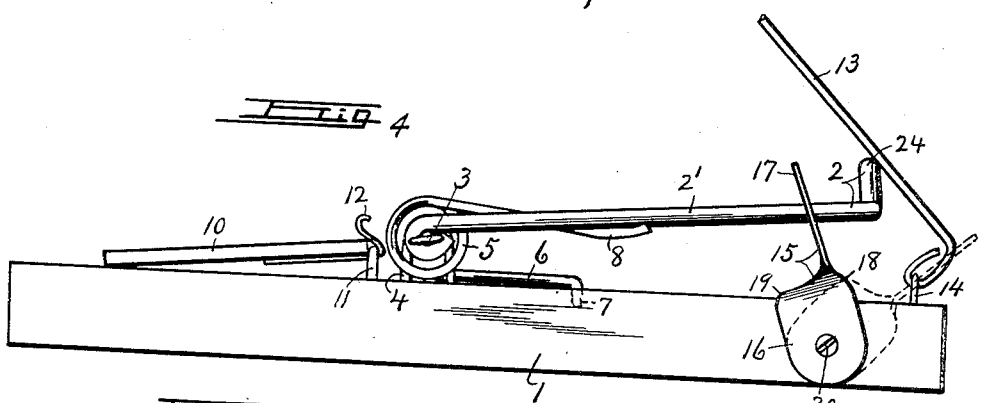
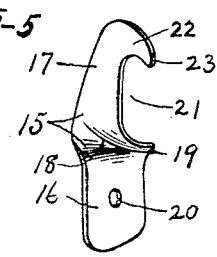

Patented Oct. 17, 1933

1,930,717

UNITED STATES PATENT OFFICE 1,930,717

ANIMAL TRAP

Albert E. Kinsley and Donald J. Kinsley, Norwich, N. Y.

Application July 30, 1931. Serial No. 554,015

2 Claims. (Cl. 43—97)

This invention relates to certain improvements in animal traps of the flat-base wire-jaw type in which the wire jaw is preferably made in the form of a loop having one end hinged to the base intermediate the ends thereof and its other end movable through an arc of substantially 180 degrees from a position at one side to a position on the opposite side of the pivot and adapted to be actuated from one position to the other by a coil spring co-axial with the axis of the pivot, in combination with a bait-pan and a suitable detent cooperating therewith for holding the jaw in its closed or set position against the action of the spring.

The jaw operated spring is usually quite heavy and is placed under relatively high tension when the jaw is set while the means for holding the jaw in its set position against the action of the spring must of necessity be free to release by the slightest pressure upon the bait pan.

Under these conditions, it is quite obvious that when the jaw is set in the manner just described, a slight jar of the trap or a slight contact of any external object against the bait pan would prematurely release the jaw and allow it to close with considerable force, thereby endangering the safety of the user, unless some means is provided for preventing accidental closing of the jaw.

The main object, therefore, of the present invention is to provide simple and efficient means for temporarily holding the jaw in its open or set position while the trap is being placed in the desired locality ready for operation so that when the trap is properly placed, the temporary holding means may be displaced by hand to allow the jaw to be operated by the tripping of the bait pan.

Another object is to provide means for limiting the movement of the temporary holding means to and from its operative position.

Other objects and uses will be brought out in the following description.

In the drawing:—

Figure 1 is a perspective view of an animal trap showing the temporary jaw holding means in its operative position by full lines and in its neutral position by dotted lines.

Figure 2 is an enlarged detail sectional view taken in the plane of line 2—2 Figure 1, showing the temporary holding means or latch in operative position and the adjacent side of the jaw in engagement with the upper face thereof preparatory to displacing same laterally to the dotted position as the jaw continues its downward movement toward its open position, the adjacent portion of the jaw being also shown by dotted lines after it has passed beneath the bite of the latch for holding the jaw against being closed by its spring.

Figure 3 is a sectional view taken in the plane of line 3—3, Figure 2.

Figure 4 is an enlarged side elevation of the trap shown in Figure 1 except that the bait pan and cooperative detent have been released and the jaw engaged with the latch.

Figure 5 is a perspective view of the detached latch.

As illustrated, this trap comprises a substantially flat base —1— of wood or other comparatively inexpensive material, a jaw —2— having at one end a pintle —3— which is pivoted in suitable bearings such as staples —4— on the base —1— intermediate the ends thereof.

The intermediate portion of the pintle —3— is surrounded by a coil spring —5— having one end —6— engaged in an aperture —7— in the base —1—, and its other end —8— engaged with the underside of the adjacent arm of the jaw —2—, both ends of the spring being extended forwardly in the same direction from the axis of the pintle —3—.

The jaw —2— is preferably made in the form of a wire loop having opposite substantially parallel sides —2'— arranged in transversely spaced relation, the inner end of one of said sides being bent at substantially right angles thereto to form the pintle —3—, while the inner end of the other arm is provided with an eye —9— embracing the adjacent end of said pintle, preferably at the outside of the corresponding staple bearing —4— where it is upset or enlarged to a greater transverse width than the opening in the eye to hold the inner end of the adjacent arm —2'— of the jaw against axial displacement from the pintle.

A bait pan —10— is hinged at one end to a suitable staple —11— on the base —1—, preferably at the rear side of and in close proximity to the spring coil —5— and is provided at its nearest hinged end with an upwardly projecting hook-shaped shoulder —12— as nearly as possible directly over the pivotal axis of the bait pan.

A detent —13— is pivoted to a suitable staple —14— on the front end of the base —1— substantially midway between the opposite sides thereof and slightly beyond the path of movement of the front end of the jaw —2— when the latter is set or open as shown by full lines in Figure 1.

The detent —13— is preferably made of relatively stiff wire and has its hinged end offset downwardly to allow the remaining portion thereof to extend across the upper face of the adjacent end of the jaw —2—, the length of the detent being approximately equal to the distance between the staple —14— and shoulder —12— on the bait pan —10— so that when the jaw —2— is moved to its set or open position against the action of the spring —5—, the detent —13— will be moved by hand across the upper face of the adjacent end of the jaw and its rear end engaged with the shoulder —12— by simply rocking the bait pan upwardly about its pivotal axis until the shoulder —12— is interlocked with the rear end of the detent.

It is now clear that when the jaw —2— is set and locked in its set position, its front end will engage the underside of the detent —13— relatively close to the pivotal staple —14— while the rear end of the detent will be engaged with the shoulder —12— of the bait pan —10— relatively close to the axis of movement of the jaw, thus providing a leverage system of relatively high power, but easily releasable, for holding the jaw in its set position against the action of the spring —5—.

It is evident from the foregoing description that when the trap is set the dominant weight of the bait pan —10— will be at the rear of the pivotal staple —11— and that the only means for holding it in its elevated position is the friction between the rear end of the detent —13— and shoulder —12— of the bait pan, due to the upward pressure of the front end of the jaw against the underside of the detent through the action of the spring —5—, and that any slight jar of the trap by contact with external objects or any slight downward pressure upon the bait pan would cause the release of the jaw and detent —13— and allow those parts to be thrown to their in-operative positions with considerable force which, of course, would endanger the safety of the user.

In order to reduce this danger to a minimum I have provided a latch —15—, preferably of thin spring steel, having lower and upper portions —16— and —17— disposed in flat planes at substantially right angles to each other so as to form front and rear shoulders —18— and —19— at the junction of the lower and upper portions —16— and —17— for a purpose presently described.

The lower flat portion —16— is pivoted at —20— to one of the upright sides of the base —1—, a relatively short distance rearwardly from the front end of the jaw —2— to swing forwardly and rearwardly.

The upper portion —17— of the catch —15— is provided, on its inner edge, with a recess —21— forming an upper hook-shaped arm —22— having an upper cam face —23—, the recess serving to receive the adjacent portion of the arm —2'— of the jaw —2—, while the arm —22— serves as a stop shoulder for engaging the upper face of the adjacent portion of the jaw to restrain the latter from closing in case the hook —12— of the bait pan should accidentally become disengaged from the rear end of the detent —13—.

The distance between the axis of the pivot —20— and lower edge of stop shoulder —22— is somewhat greater than the distance between said axis and the free end face of the adjacent side of the jaw —2— to allow the latch —15— to be rocked from the position as shown more clearly by full lines in Figures 1 and 4 to the position shown by dotted lines in the same figures.

As previously stated, the latch —15— is made of relatively thin and resilient sheet metal to permit the upper portion —17— to spring laterally into and out of engagement with the adjacent portion of the jaw —2— when the latch is adjusted for use, and the jaw is opened against the action of the spring —5—, but if desired the latch —15— may be made of non-resilient or unyielding stock in which case the opening movement of the jaw engaging the cam face —23— of the catch would cause the jaw to spring laterally sufficiently to allow it to re-engage the underside of the hook —22—.

For example, before the jaw is moved to its set or open position against the action of spring —5—, the latch —15— may be rocked by hand about its axis —20— from the dotted position shown in Figure 4 to the position shown in full lines, thereby bringing the arm —22— into the path of movement of the adjacent portion of the jaw as the latter is moved to its set or open position during which operation the adjacent arm —2'— of the jaw —2— will be brought into engagement with the cam face —23— of the arm —22—, thereby springing the upper portion of the latch outwardly and axially of the pivot —20— until the adjacent arm —2'— registers with the recess —21— whereupon the spring tension of the latch will cause the arm —22— to over-ride the adjacent arm —2'— ready to engage the same in case the shoulder —12— of the bait pan should become dis-engaged with the adjacent edge of the detent —13—.

It will now be readily understood that when the jaw —2— is opened and locked in its open position by the engagement of the detent —13— with the shoulder —12— of the bait pan —10— and the latch —15— is moved to its operative position, shown by full lines in Figure 4, the entire trap may be placed in the desired position for use with perfect safety to the user against accidental tripping of the detent —13— in which case the closing movement of the jaw —2— would be positively checked by its engagement with the arm —22— of the catch —15—.

The shoulders —17— and —18— overlie the upper face of the adjacent portion of the base —1— and are arranged to cooperate therewith for limiting the angular movement of the latch —15— about its pivot —20— within the positions shown by full lines and by dotted lines in Figure 4.

When the trap is set and properly placed, the latch —15— will be rocked from the position shown by full lines in Figure 4 to the position shown by dotted lines to bring the shoulder —2— out of the path of movement of the adjacent portion of the jaw —2—, thereby allowing the latter to be operated in the usual manner, by the spring —5— when the bait pan —10— is tripped by an animal under which conditions the jaw —2— would be instantly thrown from its extreme open position to its extreme closed position against the upper platform of the base —1— to trap the animal thereon.

The free end of the jaw —2— is provided with a rectangular offset portion —24—, a distance from the pivotal pintle —3— corresponding approximately to the distance between said pintle and rear end face of the base —1—, to enable said offset portion to engage said end face when the jaw is open and thereby to resist lateral movement of the free end of the jaw under the efforts of the animal to escape.

Although the latch —15— shown and described is particularly simple, economical, and efficient, it is obvious that various other forms of holding means for a similar purpose may be used without departing from the spirit of the invention.

What we claim is:

1. In an animal trap having a base, a jaw pivoted to the base, a spring for closing the jaw, means including a bait-pan and a detent co-operating therewith for holding the jaw in its open position, in combination with a latch for holding and releasing the jaw in and from its open position, said latch having its lower end pivoted to the outer edge of the base to swing lengthwise thereof and its upper end spring-tensioned inwardly and provided with an inwardly projecting arm adapted to engage the upper face of the adjacent side of the jaw when the latter is open.

2. In an animal trap having a base, a jaw pivoted to the base, a spring for closing the jaw, and means including a bait pan and a detent cooperating therewith for holding the jaw in its open position, in combination with a latch of spring-sheet metal having its lower and upper portions disposed in planes at substantially right angles to each other, said latch having its lower portion pivoted to one side of the base to swing lengthwise thereof and its upper portion free to spring laterally and provided with an inwardly projecting arm movable laterally and longitudinally of the base into and out of holding engagement with the adjacent side of the jaw when the latter is in its open position, the intermediate portion of the latch near the junction of its lower and upper portions being offset inwardly over the top of the adjacent portion of the base for limiting the swinging movement of the latch about its pivot.

ALBERT E. KINSLEY.
DONALD J. KINSLEY.